(12) United States Patent
Chen

(10) Patent No.: US 7,708,526 B2
(45) Date of Patent: May 4, 2010

(54) PROPELLER ASSEMBLY INCORPORATING SPINDLE WITH FINS AND OVERMOLDED BUSHING

(75) Inventor: Liheng Chen, Elk Grove Village, IL (US)

(73) Assignee: Turning Point Propellers, Inc., Elk Grove Village, IL (US)

( * ) Notice: Subject to any disclaimer, the term of this patent is extended or adjusted under 35 U.S.C. 154(b) by 0 days.

(21) Appl. No.: 11/961,513

(22) Filed: Dec. 20, 2007

(65) Prior Publication Data

US 2009/0163089 A1 Jun. 25, 2009

(51) Int. Cl.
*B63H 1/06* (2006.01)
(52) U.S. Cl. .................... 416/134 R; 440/49
(58) Field of Classification Search .............. 440/49; 416/134 R
See application file for complete search history.

(56) References Cited

U.S. PATENT DOCUMENTS

| | | | |
|---|---|---|---|
| 1,906,057 A | 4/1933 | Guy | |
| 2,235,605 A | 3/1941 | Bugatti | |
| 2,469,116 A | 5/1949 | Kiekhaefer | |
| 2,471,982 A | 5/1949 | Shulda | |
| 2,556,151 A | 6/1951 | Bremer | |
| 2,956,187 A | 10/1960 | Wood | |
| 2,974,502 A | 3/1961 | Radcliff | |
| 3,002,365 A | 10/1961 | Liljequist | |
| 3,045,763 A | 7/1962 | Perrott | |
| 3,563,670 A | 2/1971 | Knuth | |
| 3,701,611 A * | 10/1972 | Lambrecht | 416/134 R |
| 3,764,228 A | 10/1973 | Shook | |
| 3,865,509 A | 2/1975 | Frazzell et al. | |
| 3,876,331 A | 4/1975 | DenHerder et al. | |
| 4,338,064 A | 7/1982 | Carmel | |
| 4,417,852 A | 11/1983 | Costabile et al. | |
| 4,452,591 A | 6/1984 | Fishaugh et al. | |
| 4,566,855 A | 1/1986 | Costabile et al. | |
| 4,642,057 A | 2/1987 | Frazzell et al. | |
| 4,778,419 A | 10/1988 | Bolle et al. | |
| 4,802,822 A | 2/1989 | Gilgenbach et al. | |
| 4,826,404 A | 5/1989 | Zwicky | |
| 4,842,483 A | 6/1989 | Geary | |

(Continued)

FOREIGN PATENT DOCUMENTS

DE 1152132 9/1967

(Continued)

*Primary Examiner*—Stephen Avila
(74) *Attorney, Agent, or Firm*—Boyle Fredrickson, S.C.

(57) ABSTRACT

A propeller assembly is provided for mounting on a rotatable propeller shaft of a watercraft. The propeller assembly includes a housing structure extending along a longitudinal axis. The housing structure includes an outer surface and an inner surface defining a cavity having a polygonal-shaped cross-section defined by at least one corner and at least one sidewall. A bushing assembly is receivable in the cavity of the housing structure. The bushing assembly includes a spindle having an inner surface defining a passageway for receiving the propeller shaft therethrough and an outer surface having a plurality of circumferentially spaced fin pairs extending therealong. Each fin pair includes a first fin extending from the outer surface of the spindle and a second fin extending from the outer surface of the spindle at a predetermined angle to the first fin. The bushing assembly also includes a bushing positioned between the spindle and the inner surface of the housing structure.

17 Claims, 7 Drawing Sheets

U.S. PATENT DOCUMENTS

| | | | |
|---|---|---|---|
| 4,898,552 A | 2/1990 | Cochran |
| 4,911,663 A | 3/1990 | Meier |
| 5,022,875 A | 6/1991 | Karls |
| 5,049,034 A | 9/1991 | Cahoon |
| 5,201,679 A | 4/1993 | Velte, Jr. et al. |
| 5,244,348 A | 9/1993 | Karls et al. |
| 5,252,028 A | 10/1993 | LoBosco et al. |
| 5,322,416 A | 6/1994 | Karls et al. |
| 5,484,264 A | 1/1996 | Karls et al. |
| 5,527,153 A | 6/1996 | Bernhardt |
| 5,810,561 A | 9/1998 | Cossette |
| 5,908,284 A | 6/1999 | Lin |
| 5,967,751 A | 10/1999 | Chen |
| 6,358,008 B1 | 3/2002 | Chen |
| 6,383,042 B1 | 5/2002 | Neisen |
| 6,471,481 B2 | 10/2002 | Chen |
| 6,478,543 B1 * | 11/2002 | Tuchscherer et al. | 416/134 R |
| 6,524,069 B2 | 2/2003 | Chen |
| 6,672,834 B2 | 1/2004 | Chen |
| 6,682,377 B2 | 1/2004 | Ishikawa et al. |
| 2006/0263219 A1 * | 11/2006 | Dean | 416/134 R |

FOREIGN PATENT DOCUMENTS

| | | |
|---|---|---|
| GB | 201198 A | 8/1988 |
| KR | 10-2001-0024471 | 3/2001 |
| SU | 0441009 | 8/1974 |

* cited by examiner

PROPELLER ASSEMBLY INCORPORATING SPINDLE WITH FINS AND OVERMOLDED BUSHING

FIELD OF THE INVENTION

This invention relates generally to propellers, and in particular, to a propeller assembly for translating rotational movement from a propeller shaft of a marine vehicle to the blades of a propeller.

BACKGROUND AND SUMMARY OF THE INVENTION

It is known to propel a marine vehicle utilizing a propeller assembly mounted on a rotatable drive shaft. The propeller assembly includes a plurality of propeller blades extending radially from a central hub. A motor rotates the drive shaft that, in turn, rotates the propeller blades propelling the marine vehicle through the water. Typically, the propeller assembly is constructed as a unit wherein the propeller blades and the central hub are mounted or removed from the drive shaft in unison. Alternatively, in order to reduce the time and costs associated with replacing the propeller blades, it has been contemplated to provide a propeller assembly for a marine engine wherein the propeller blades project from a propeller housing that is removable from a central hub.

By way of example, Chen, U.S. Pat. No. 5,967,751 discloses a marine propeller assembly that includes a central hub secured to the propeller shaft and having three or more axially extending keys on the outer surface thereof. A propeller housing includes an inner surface having three or more pairs of lobes for forming keyways that receive the keys of the central hub. A retainer disc is threaded on a propeller shaft and includes a plurality of angularly spaced ears for engaging with the lobes on the inner surface on the propeller housing in order to prevent the propeller housing from being disengaged from the central hub.

While the advantages of a removal propeller housing are readily apparent, it can be appreciated that it is often highly desirable to retain the propeller assembly on the propeller shaft in such a manner as to prevent any unnecessary movement of the propeller assembly that may reduce the overall efficiency of the drive system of the marine vehicle. However, during such circumstances when the propeller blades engage a fixed object in the water such as a rock or the like, it may become necessary for the drive shaft of the marine vehicle to become disengaged from the propeller housing in order to prevent damage to the drive system of the marine vehicle. Consequently, it is desirable to provide a propeller assembly that disengages from the drive shaft in response to a predetermined force thereon. However, once a propeller assembly has disengaged from the drive shaft, the operator typically must replace the central hub or a component of the hub before the propeller assembly can be used again. Further, it has been noted that most damage to a drive system occurs within 5° of rotation by the propeller shaft after the propeller assembly stops rotating. For these reasons, it is highly desirable to provide a propeller assembly that permits continued rotation of the propeller shaft for at least 5° after the propeller housing disengages from the shaft.

In addition, it is known that the drive shafts driven by the various motors for marine vehicles differ depending upon the manufacture. Consequently, individual propellers must be provided for the drive shafts of each motor brand. Maintaining an inventory of specific propellers for each brand of motor requires significant storage space and may be cost prohibitive.

Therefore, it is a primary object and feature of the present invention to provide a propeller assembly which permits limited continued rotation of the spindle and propeller shaft before disengaging the propeller shaft from the propeller assembly.

It is still a further object and feature of the present invention to provide a propeller assembly that may be simply and easily mounted on and removed from the drive shaft of a marine vehicle.

It is a still further object and feature of the present invention to provide a propeller assembly that may be easily adapted for mounting on the drive shafts of different manufacturers' motors.

It is a still further object and feature of the present invention to provide a propeller assembly that is simple and inexpensive to manufacture.

In accordance with the present invention, an improvement in a propeller assembly having a housing structure connectable to a rotatable propeller shaft of a watercraft is provided. The housing structure extends along a longitudinal axis and has an inner surface defining passageway therethrough. The improvement includes a spindle receivable in the passageway of the housing. The spindle has an inner surface defining a passageway for receiving the propeller shaft therethrough and an outer surface. The improvement also includes plurality of circumferentially spaced, longitudinally extending fin pairs. Each fin pair includes a first fin extending from the outer surface of the spindle and a second fin extending from the outer surface of the spindle at a predetermined angle to the first fin.

A bushing is molded over the outer surface of the spindle. The bushing includes an outer surface engageable with an inner surface of the housing structure. The bushing is formed from a resilient material and has a generally square-shaped cross section and rounded corners. The inner surface of the spindle includes a plurality of longitudinally extending splines.

The inner surface of the housing structure has a generally square-shaped cross section and at least four fin pairs extend from the outer surface of the spindle. The inner surface of the housing structure is defined by first, second, third and fourth sidewalls. The first and second sidewalls is generally parallel to each other. The third and fourth sidewalls are generally parallel to each other and generally perpendicular to the first and second spaced sidewalls. The first fin of a first fin pair is directed toward the first sidewall of the inner surface of the housing structure and the second fin of the first fin pair is directed toward the third sidewall. The first fin of a second fin pair is directed toward the first sidewall of the inner surface of the housing structure and the second fin of the second fin pair is directed toward the fourth sidewall. It is contemplated for the fin pairs to fragment from the outer surface of the spindle in response to a predetermined force thereon.

In accordance with a further aspect of the present invention, a propeller assembly is provided for mounting on a rotatable propeller shaft of a watercraft. The propeller assembly includes a housing structure extending along a longitudinal axis. The housing structure includes an outer surface and an inner surface defining a cavity having a polygonal-shaped cross-section defined by at least one corner and at least one sidewall. A bushing assembly is receivable in the cavity of the housing structure. The bushing assembly includes a spindle having an inner surface defining a passageway for receiving the propeller shaft therethrough and an outer surface having a plurality of circumferentially spaced fin pairs extending therealong. Each fin pair includes a first fin extending from the outer surface of the spindle and a second fin extending from the outer surface of the spindle at a predetermined angle to the first fin. A bushing is positioned between the spindle and the inner surface of the housing structure.

The bushing is formed from a resilient material and the inner surface of the housing structure has a generally square-shaped cross section. The at least one sidewall of the inner surface of the housing structure includes first and second spaced sidewalls being generally parallel to each other and third and fourth sidewalls being generally parallel to each other and perpendicular to the first and second spaced sidewalls. The first fin of a first fin pair is directed toward the first sidewall of the inner surface of the housing structure and the second fin of the first fin pair is directed toward the third sidewall. The first fin of a second fin pair is directed toward the first sidewall of the inner surface of the housing structure and the second fin of the second fin pair is directed toward the fourth sidewall. It is contemplated for the fin pairs to fragment from the outer surface of the spindle in response to a predetermined force thereon.

In accordance with a still further aspect of the present invention, a propeller assembly is provided for mounting on a rotatable propeller shaft of a watercraft. The propeller assembly includes a housing structure extending along a longitudinal axis. The housing structure includes an outer surface and an inner surface defining a cavity. The inner surface is defined by first, second, third and fourth sidewalls. The first and second sidewalls are generally parallel to each other. The third and fourth sidewalls are generally parallel to each other and perpendicular to the first and second spaced sidewalls. A bushing assembly includes a spindle having an inner surface defining a passageway for receiving the propeller shaft therethrough and an outer surface. A first fin pair extends from the outer surface of the spindle and has a first fin is directed towards the first sidewall of the inner surface of the housing structure and a second fin directed towards the third sidewall. A second fin pair extends from the outer surface of the spindle and has a first fin is directed towards the first sidewall of the inner surface of the housing structure and a second fin directed towards the fourth sidewall. A third fin pair extends from the outer surface of the spindle and has a first fin is directed towards the second sidewall of the inner surface of the housing structure and a second fin directed towards the third sidewall. A fourth fin pair extends from the outer surface of the spindle and has a first fin is directed towards the second sidewall of the inner surface of the housing structure and a second fin directed towards the fourth sidewall.

A bushing is positioned between the spindle and the inner surface of the housing structure. The bushing is formed from a resilient material.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
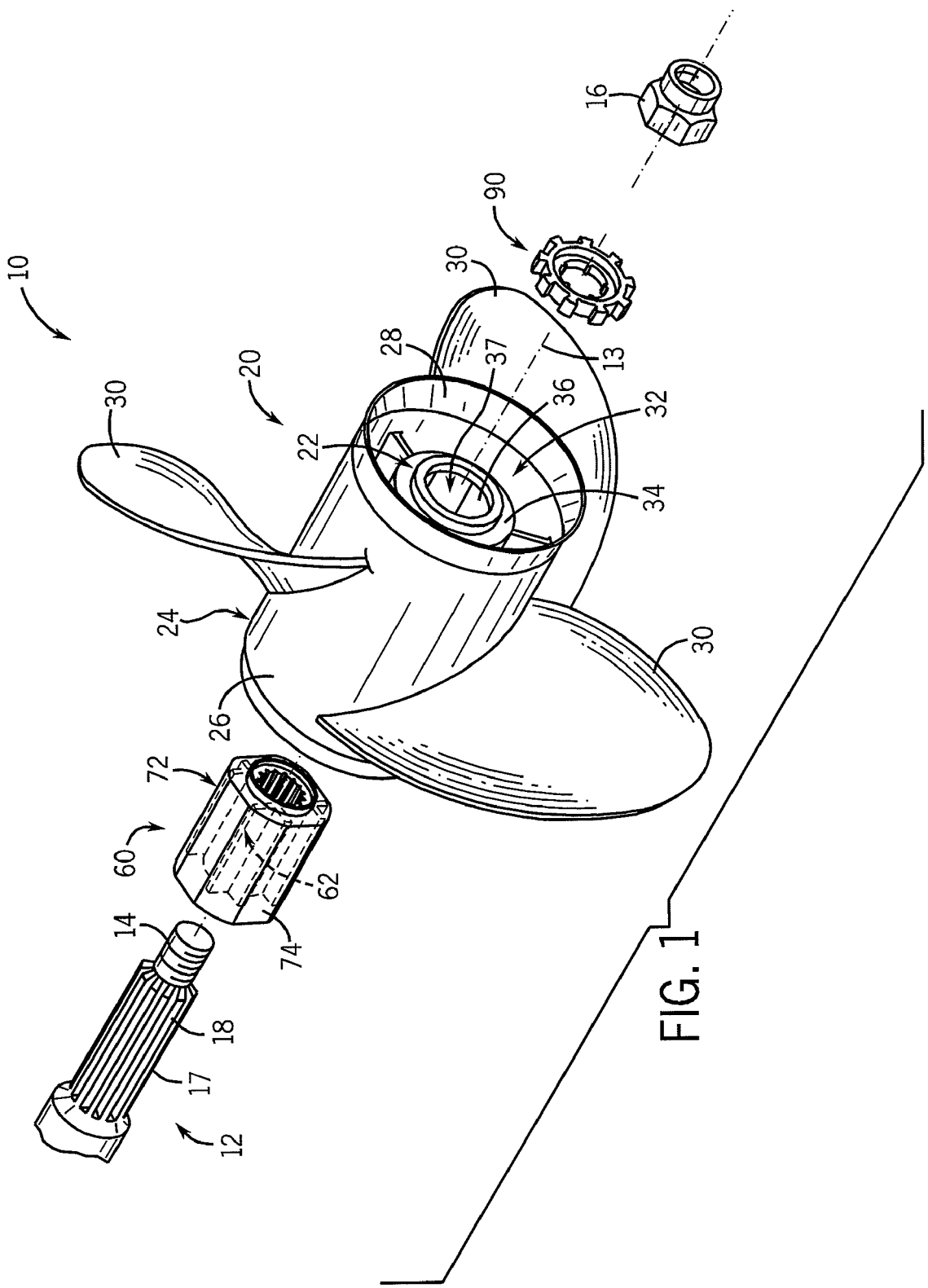
FIG. 1 is an exploded, isometric view of a propeller assembly of an embodiment of the present invention.

Referring to FIG. 1, a propeller assembly in accordance with the present invention is generally designated by the reference numeral 10. It is intended that propeller assembly 10 be mounted on a rotatable propeller shaft 12 which, in turn, is driven by a marine engine (not shown). Propeller shaft 12 extends along a longitudinal axis and terminates at a threaded terminal end 14 adapted for receiving a locking nut 16 thereon, for reasons hereinafter described. As is conventional, rotatable shaft 12 includes an outer surface 17 having longitudinally extending splines 18 therealong adjacent terminal end 14.

Figure 2:
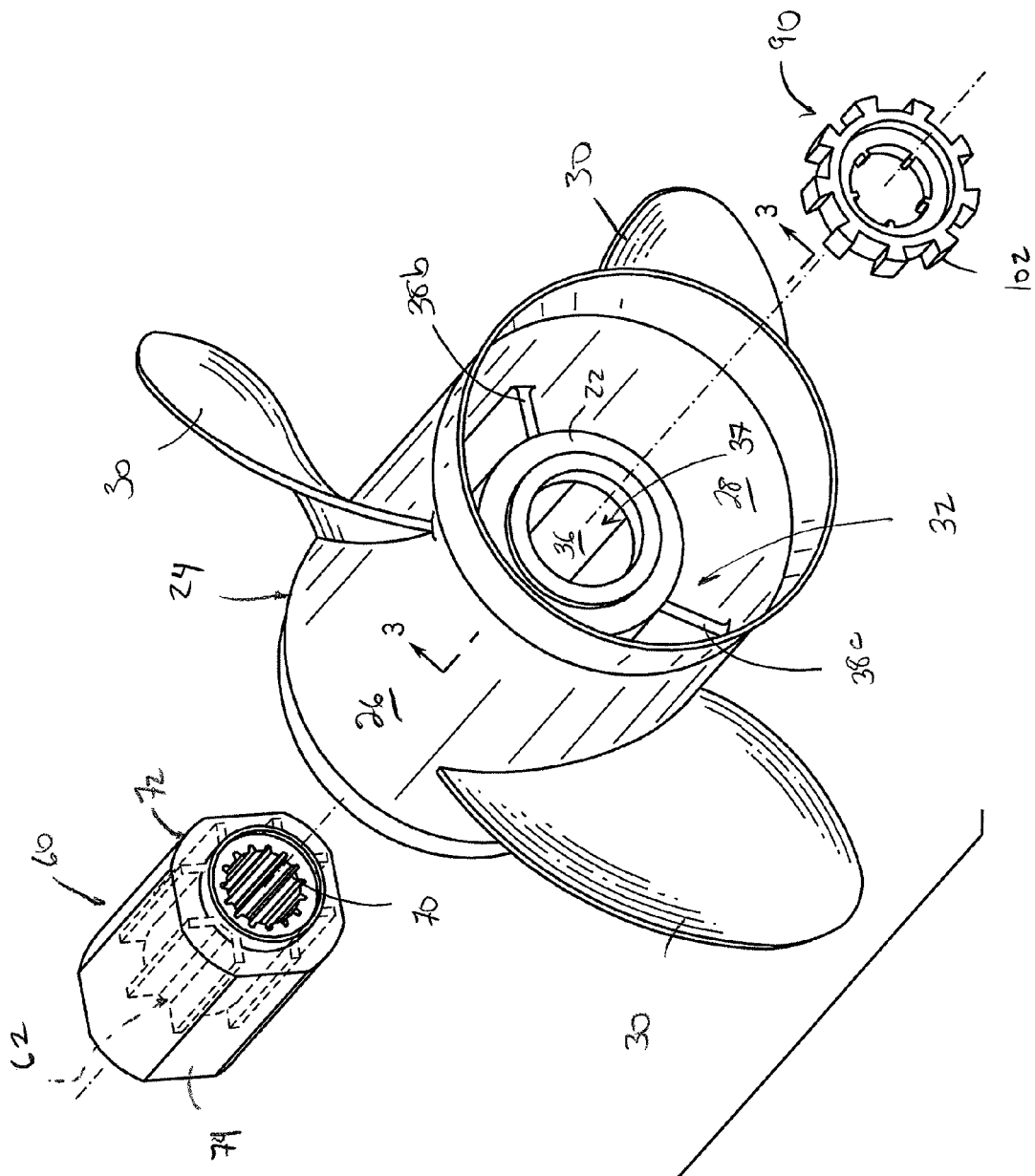
FIG. 2 is an enlarged view of the propeller assembly of FIG. 1.
Figure 3:
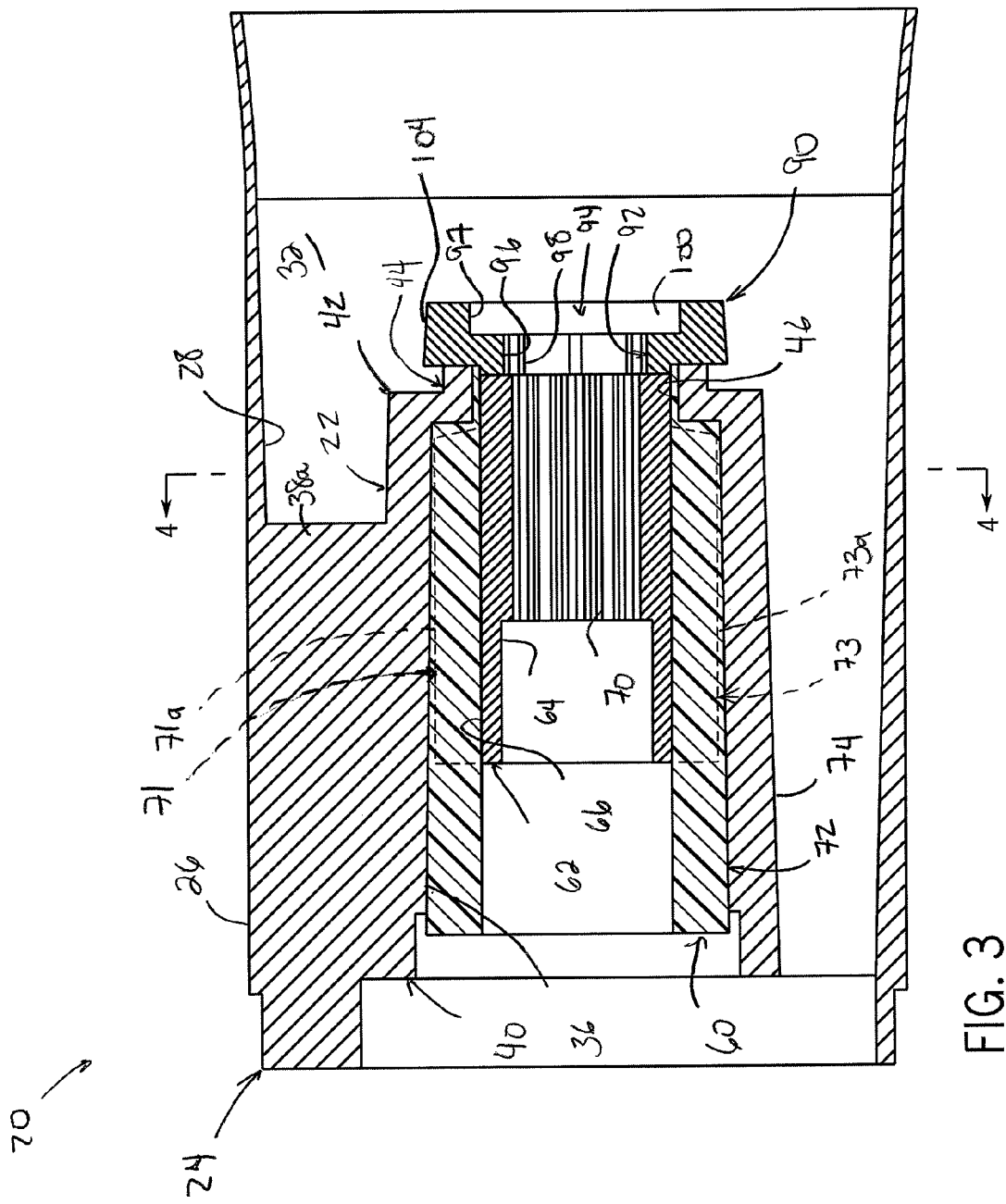
FIG. 3 is a cross-sectional view of the propeller assembly of the present invention taken along line 3-3 of FIG. 2.

Referring to FIGS. 1-3, propeller assembly 10 includes a central hub 20 having a generally cylindrical inner housing 22 and a generally cylindrical outer housing 24. Outer housing 24 has an outer surface 26 and an inner surface 28. A plurality of circumferentially spaced propeller blades 30 project radially from outer surface 26 of outer housing 24. Inner surface 28 defines an inner housing receipt cavity 32 for receiving inner housing 22 therein. Outer surface 34 of inner housing 22 and inner surface 28 of outer housing 24 are rigidly connected by a plurality of circumferentially spaced connection spokes 38a-38c extend therebetween. Spokes 38a-38c are circumferentially spaced about the outer surface 34 of inner housing 22.

Figure 4:
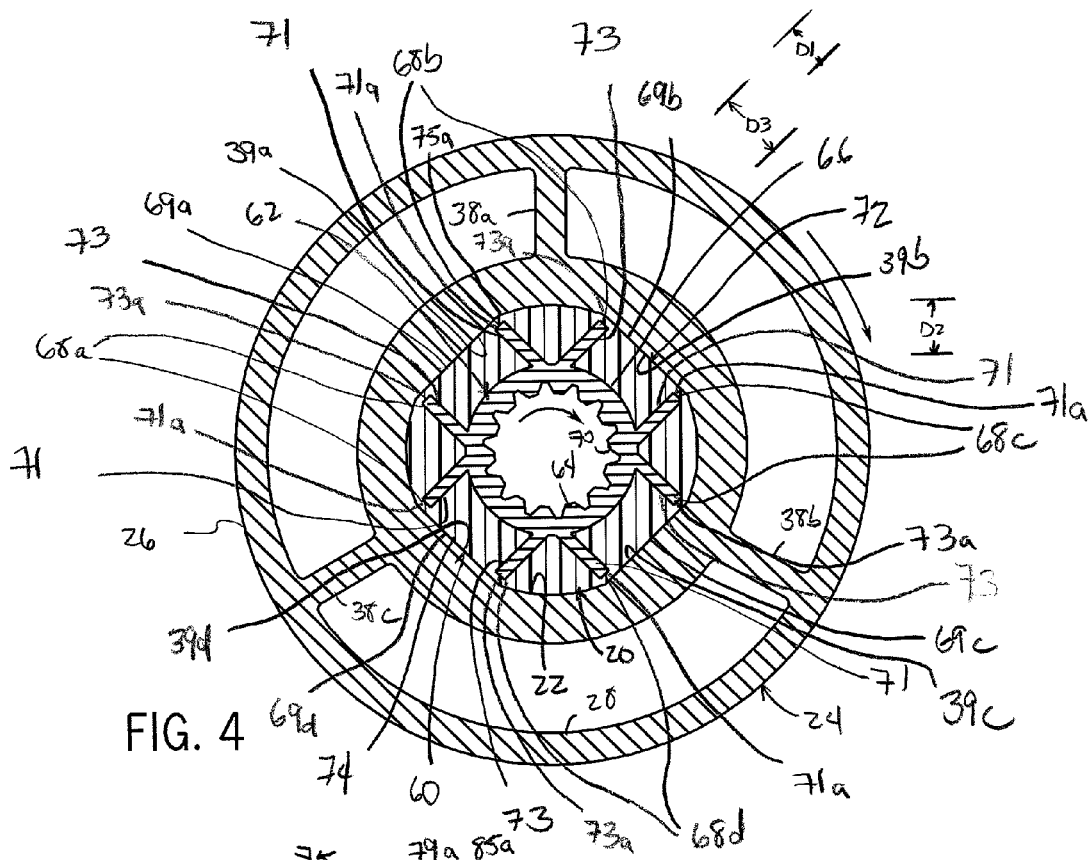
FIG. 4 is a cross-sectional view of the propeller assembly of the present invention taken along line 4-4 of FIG. 3 showing the propeller assembly during normal operating conditions.
Figure 5:
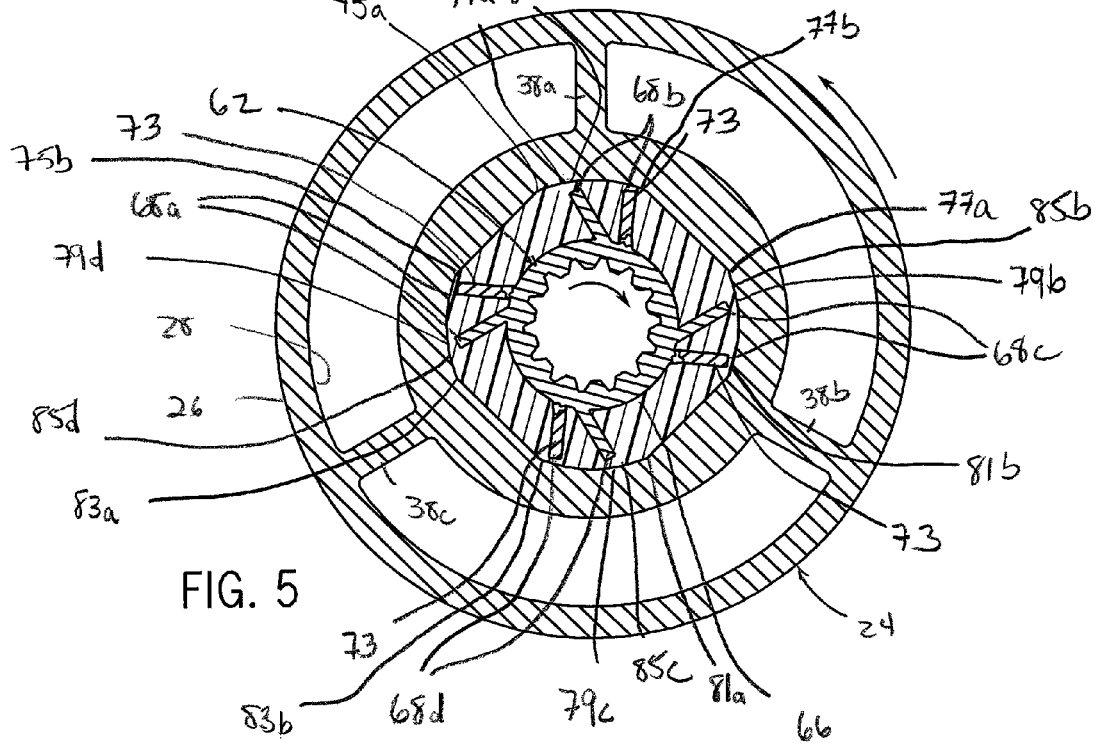
FIG. 5 is a cross-sectional view of the propeller assembly of the present invention taken along line 4-4 of FIG. 3 showing the propeller assembly at a first time period after the propeller housing has stopped rotating while the propeller shaft continues to rotate.
Figure 6:
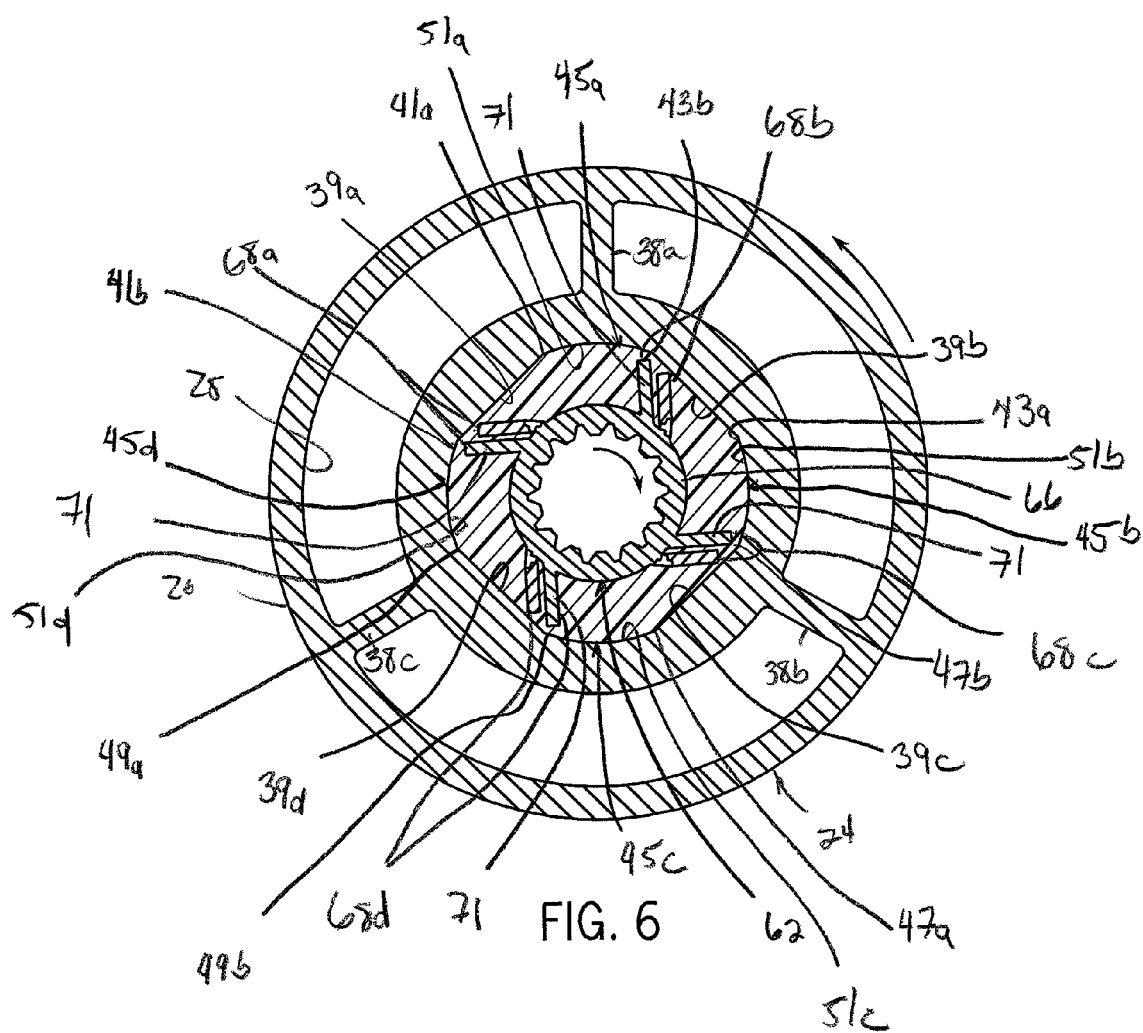
FIG. 6 is a cross-sectional view of the propeller assembly of the present invention, similar to FIG. 5, showing the propeller assembly at a second time period after the propeller housing has stopped rotating while the propeller shaft continues to rotate.

Inner housing 22 of central hub 20 includes an inner surface 36 defining inner cavity 37 for receiving bushing assembly 60, as hereinafter described. Inner housing 22 further includes first and second opposite ends 40 and 42, respectively. End flange 44 projects radially inward from second end 42 of inner housing 22 and terminates at a radially inner surface 46 which defines generally circular opening 48. As best seen in FIGS. 4-6, inner surface 36 of inner housing 22 is partially defined by first, second, third and fourth circumferentially spaced, longitudinally extending faces 39a-39d, respectively. First and third faces 39a and 39c, respectively, are generally parallel to and face each other. Similarly, second and fourth faces 39b and 39d, respectively, are generally parallel to and face each other. In addition, first and third faces 39a and 39c, respectively, are generally perpendicular to second and fourth faces 39b and 39d, respectively. Faces 39a-39d and outer surface 66 of spindle 62 are spaced by predetermined distances D1. It can be appreciated that as described, cavity 37 within inner housing 22 has a generally square cross-section.

First side 41a of first face 39a is interconnect to second side 43b of second face 39b by a generally arcuate, longitudinally extending first corner 45a. First side 43a of second face 39b is interconnect to second side 47b of third face 39c by a generally arcuate, longitudinally extending second corner 45b. First side 47a of third face 39c is interconnect to second side 49b of fourth face 39d by a generally arcuate, longitudinally extending third corner 45c. First side 49a of fourth face 39d is interconnect to second side 41b of first face 39a by a generally arcuate, longitudinally extending fourth corner 45d. For reasons hereinafter described, with propeller assembly 10 assembled, it can be appreciated the inner surfaces 51a-51d, of corners 45a-45d, respectively, are a predetermined distance D2 from outer surface 66 of spindle 62.

Propeller assembly 10 further includes bushing assembly 60 which is intended to translate rotation of propeller shaft 12 to central hub 20. Bushing assembly 60 includes spindle 62 having an inner surface 64 and a generally cylindrical outer surface 66. Inner surface 64 of spindle 62 includes a plurality of longitudinally extending splines 70 extending therealong which are intended to mesh with splines 18 extending along propeller shaft 12 when bushing assembly 60 is mounted thereon.

A plurality of circumferentially spaced, longitudinally extending fin pairs 68a-68d project radially from outer surface 66 of spindle 62. Each fin pair 68a-68d includes a first fin 71 and a second fin 73 generally perpendicular to first fin 71. First and second fins 71 and 73 of each fin pair 68a-68d terminate at corresponding end surfaces 71a and 73a, respectively. End surfaces 71a and 73a of first and second fins 71 and 73, respectively, of fin pairs 68a-68d are radially spaced from outer surface 66 of spindle 62 by a predetermined distance D3. For reasons hereafter described, distance D3 is greater than distance D1 and less than distance D2. It is contemplated for first and second fins 71 and 73, respectively, of fin pairs 68a-68d to be frangible such that first and second fins 71 and 73, respectively, of fin pairs 68a-68d disengage from outer surface 66 of spindle 62 in response to a predetermined force thereon.

Bushing assembly 60 further includes bushing 72 fabricated from any one of various resilient natural or synthetic materials which normally retain their molded shape, permit some flexing and distortion under shear, and resume their molded shape after the stress is removed. Bushing 72 includes outer surface 74 corresponds in shape to inner surface 36 of inner housing 22 of central hub 20. More specifically, outer surface 74 of bushing 72 is partially defined by is partially defined by first, second, third and fourth circumferentially spaced, longitudinally extending faces 69a-69d, respectively. First and third faces 69a and 69c, respectively, are generally parallel to and face each other. Similarly, second and fourth faces 69b and 69d, respectively, are generally parallel to and face each other. In addition, first and third faces 69a and 69c, respectively, are generally perpendicular to second and fourth faces 69b and 69d, respectively. Faces 69a-69d and longitudinal axis 13 are spaced by predetermined distances D1.

First side 75a of first face 69a is interconnected to second side 77b of second face 69b by a generally arcuate, longitudinally extending first corner 79a. First side 77a of second face 69b is interconnected to second side 81b of third face 69c by a generally arcuate, longitudinally extending second corner 79b. First side 81a of third face 69c is interconnected to second side 83b of fourth face 69d by a generally arcuate, longitudinally extending third corner 79c. First side 83a of fourth face 69d is interconnected to second side 75b of first face 69a by a generally arcuate, longitudinally extending fourth corner 79d. For reasons hereinafter described, it can be appreciated the outer surfaces 85a-85d, of corners 79a-79d, respectively, are a predetermined distance D2 from outer surface 66 of spindle 62. As described, bushing assembly 60 has a generally square-shaped cross section.

As best seen in FIG. 4, bushing 72 is molded over the spindle 62 such that second fin 73 of fin pair 68a and first fin 71 of fin pair 68b extend toward corresponding first face 69a of bushing 72; second fin 73 of fin pair 68b and first fin 71 of fin pair 68c extend toward corresponding second face 69b of bushing 72; second fin 73 of fin pair 68c and first fin 71 of fin pair 68d extend toward corresponding third face 69c of bushing 72; and second fin 73 of fin pair 68d and first fin 71 of fin pair 68a extend toward corresponding fourth face 69d bushing 72. As described, it is contemplated for second fin 73 of fin pair 68a and first fin 71 of fin pair 68b to be generally parallel; second fin 73 of fin pair 68b and first fin 71 of fin pair 68c to be generally parallel; second fin 73 of fin pair 68c and first fin 71 of fin pair 68d to be generally parallel; and second fin 73 of fin pair 68d and first fin 71 of fin pair 68a to be generally parallel.

In order to assemble a propeller assembly 10, bushing assembly 60 is inserted within inner cavity 37 of inner housing 22 such that outer surface 74 of bushing 72 engages inner surface 36 of inner housing 22 and such that first end 76 of bushing assembly 60 is positioned against end flange 44. More specifically, faces 69a-69d of bushing 72 engage corresponding faces 39a-39d of inner surface 36 of inner housing 22 and outer surfaces 85a-85d of corners 79a-79d, respectively, of bushing 72 engage corresponding inner surfaces 51a-51d of corners 45a-45d, respectively, of inner housing 22 of central hub 20.

In order to mount the propeller assembly 10 on propeller shaft 12, terminal end 14 of propeller shaft 12 is axially inserted through bushing assembly 60 such that splines 18 on outer surface 17 of propeller shaft 12 mesh with splines 70 along inner surface 64 of spindle 62 and such that terminal end 14 of propeller shaft 12 extends through the opening 48 defined by flange 44 of inner housing 22. Spider washer 90 is positioned on terminal end 14 of propeller shaft 12 adjacent outer surface 44a of flange 44 of inner housing. Spider washer 90 includes an inner surface 92 defining a passageway 94 therethrough. Longitudinally extending splines 98 extend along a first portion 96 of inner surface 92 of spider washer 90 and are adapted to mesh with splines 18 of propeller shaft 12. Inner surface 92 of spider washer 90 further includes a second portion 97 defined an enlarged portion 100 of passageway 94. Enlarged portion 100 of passageway 94 has is sufficient dimension to receive locking nut 16 threaded on terminal end 14 of propeller shaft 12 therein. It is contemplated for a plurality of circumferentially spaced tabs 102 to extend from outer surface 104 of spider washer 90. Tabs 102 are adapted for receiving a tab washer (not shown) which may be provided by selected OEM manufacturers of marine drive equipment in order to help maintain propeller assembly 10 on drive shaft 12.

As is conventional, meshed splines 18 and 70 of propeller shaft 12 and spindle 62, respectively, translate rotation of propeller shaft 12 to central hub 20 through bushing assembly 60. Rotation of the propeller blades 30 projecting from outer surface 26 of outer housing 24 propels a marine vehicle through the water. If propeller blades 30 become fixed due to engagement with an object in the water such that the propeller blades cannot rotate, it can be appreciated that the engine of the marine vehicle will continue to attempt to rotate propeller shaft 12. As a result, rotational force will be exerted on first and second fins 71 and 73 of each fin pairs 68a-68d projecting from outer surface 66 of spindle 62 by the propeller shaft 12. If the force on first and second fins 71 and 73 exceeds a predetermined force, first and second fins 71 and 73 of each fin pairs 68a-68d will compress bushing 72 and rotate. As shown in FIG. 5, first and second fins 71 and 73 of each fin pairs 68a-68d only rotate a few degrees until second fins 73 of fin pairs 68a-68d engage corresponding faces 39a-39d of inner surface 36 of inner housing 22 since end surfaces 73a of second fins 73 of fin pairs 68a-68d are a greater radial distance D3 from outer surface 66 of spindle 62 than the distance D1 that faces 39a-39d are from outer surface 66 of spindle 62.

During operation of a marine vehicle in a body of water, rotation of propeller shaft 12 is translated to propeller assembly 10 such that propeller blades 30 propel the marine vehicle through the body of water. In the event that propeller blades 30 become fixed due to engagement with an object in the water, it can be appreciated that the engine of the marine vehicle will continue to attempt to rotate propeller shaft 12. With propeller assembly 10 fixed by the object in the body of water, the rotational force generated by propeller shaft 12 on bushing assembly 60 will urge first fins 71 of fin pairs 68a-68d towards corresponding second sides 41b, 43b, 47b and 49b of corresponding faces 39a-39d of inner surface 36 of inner housing 22, FIG. 5, as heretofore described. With first fins 71 of fin pairs 68a-68d engaging corresponding second sides 41b, 43b, 47b and 49b of corresponding faces 39a-39d of inner surface 36 of inner housing 22, it is contemplated for first fins 71 of fin pairs 68a-68d to fragment from outer surface 66 of spindle 62 in response to predetermined forces thereon.

In the event that propeller blades 30 become disengaged from the object in the water after second fins 73 of fin pairs 68a-68d fragment from outer surface 66 of spindle 62, FIG. 6, it can be appreciated that first fins 71 of fin pairs 68a-68d have the ability to translate the rotational force generated by propeller shaft 12 to central hub 20 of propeller assembly 10, as heretofore described. However, if propeller blades 30 of propeller assembly 10 remain fixed by the object in the body of water, the rotational force generated by propeller shaft 12 on bushing assembly 60 will urge first fins 71 of fin pairs 68a-68d into engagement with corresponding faces 39a-39d of inner surface 36 of inner housing 22, as heretofore described. With first fins 71 of fin pairs 68a-68d engaging corresponding faces 39a-39d of inner surface 36 of inner housing 22, it is contemplated for first fins 73 of fin pairs 68a-68d to fragment from outer surface 66 of spindle 62 in response to predetermined forces thereon. In the event that first and second fins 71 and 73 of fin pairs 68a-68d fragment from outer surface 66 of spindle 62, bushing assembly 60 is free to rotate within cavity 37 of inner housing 22. In such manner, it is intended to avoid damage to the engine and to the drive system of the marine vehicle.

It can be appreciated that propeller assembly 10 may be assembled as heretofore described prior to the mounting thereof on propeller shaft 12. In such manner, bushing assembly 60 may be modified so as to adapt to various types of propeller shafts 12 produced by different manufacturers. In other words, utilizing a modified bushing assembly 60, propeller assembly 10 may be mounted on each of the various types of propeller shafts.

Figure 7:
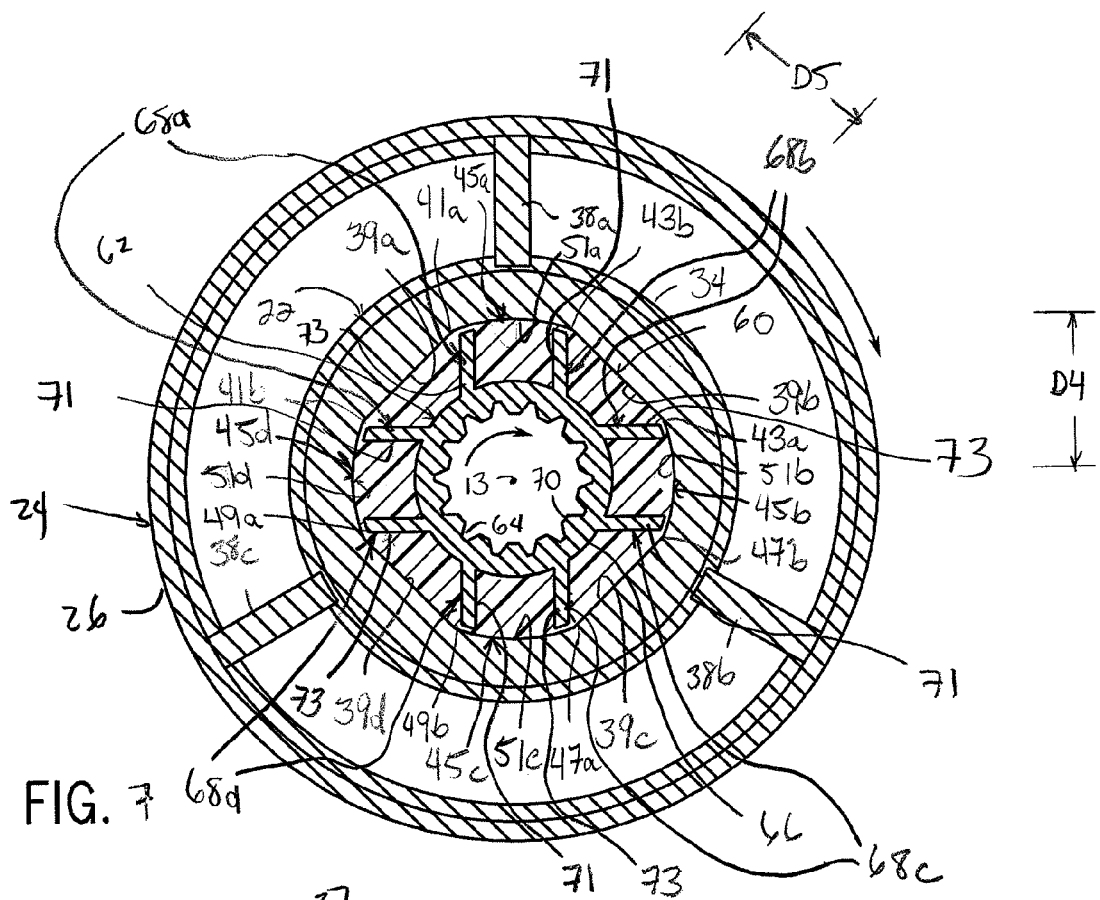
FIG. 7 is a cross-sectional view of an alternate embodiment of the propeller assembly of the present invention, similar to FIG. 3, showing the propeller assembly during normal operating conditions.

As best seen in FIG. 7, bushing 72 may be molded over the spindle 62 such that second fin 73 of fin pair 68a and first fin 71 of fin pair 68b extend toward corresponding corner 79a of bushing 72; second fin 73 of fin pair 68b and first fin 71 of fin pair 68c extend toward corresponding corner 79b of bushing 72; second fin 73 of fin pair 68c and first fin 71 of fin pair 68d extend toward corresponding corner 79c of bushing 72; and second fin 73 of fin pair 68d and first fin 71 of fin pair 68a extend toward corresponding corner 79d of bushing 72. As described, it is contemplated for second fin 73 of fin pair 68a and first fin 71 of fin pair 68b to be generally parallel; second fin 73 of fin pair 68b and first fin 71 of fin pair 68c to be generally parallel; second fin 73 of fin pair 68c and first fin 71 of fin pair 68d to be generally parallel; and second fin 73 of fin pair 68d and first fin 71 of fin pair 68a to be generally parallel.

In operation, rotation of the propeller blades 30 projecting from outer surface 26 of outer housing 24 propels a marine vehicle through the water. If propeller blades 30 become fixed due to engagement with an object in the water such that the propeller blades cannot rotate, it can be appreciated that the engine of the marine vehicle will continue to attempt to rotate propeller shaft 12. As a result, rotational force will be exerted on first and second fins 71 and 73 of each fin pairs 68a-68d projecting from outer surface 66 of spindle 62 by the propeller shaft 12. If the force on first and second fins 71 and 73 exceeds a predetermined force, first and second fins 71 and 73 of each fin pairs 68a-68d will compress bushing 72 and rotate.

Figure 8:
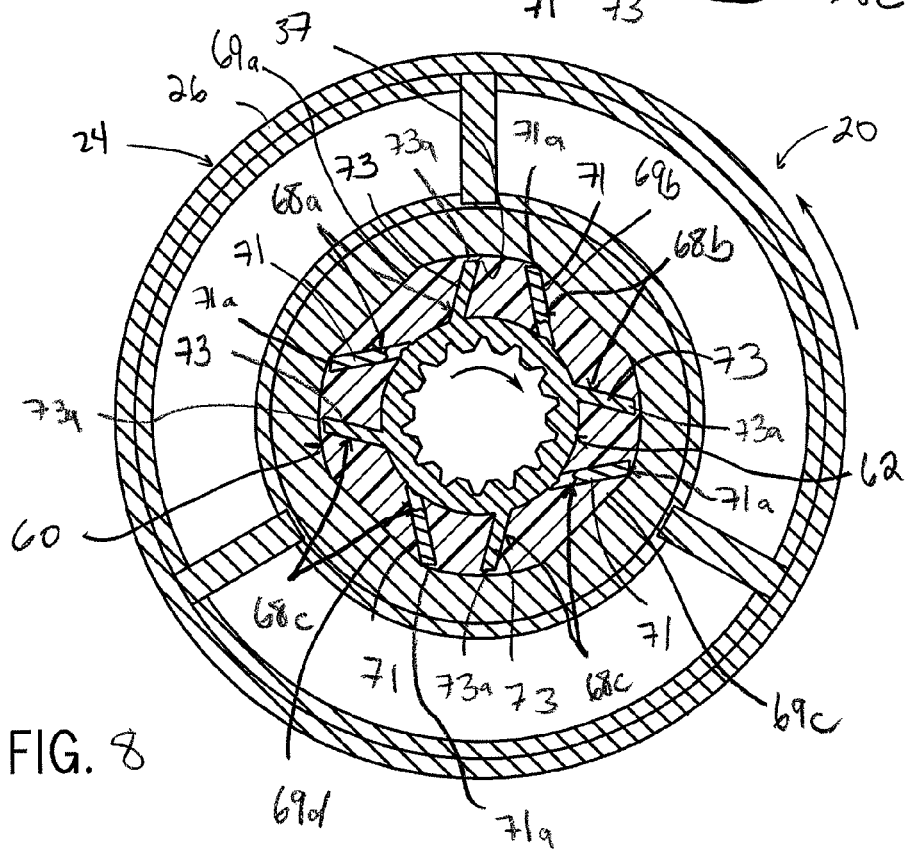
FIG. 8 is a cross-sectional view of the propeller assembly of the present invention, similar to FIG. 7, showing the propeller assembly at a first time period after the propeller housing has stopped rotating while the propeller shaft continues to rotate.
Figure 9:
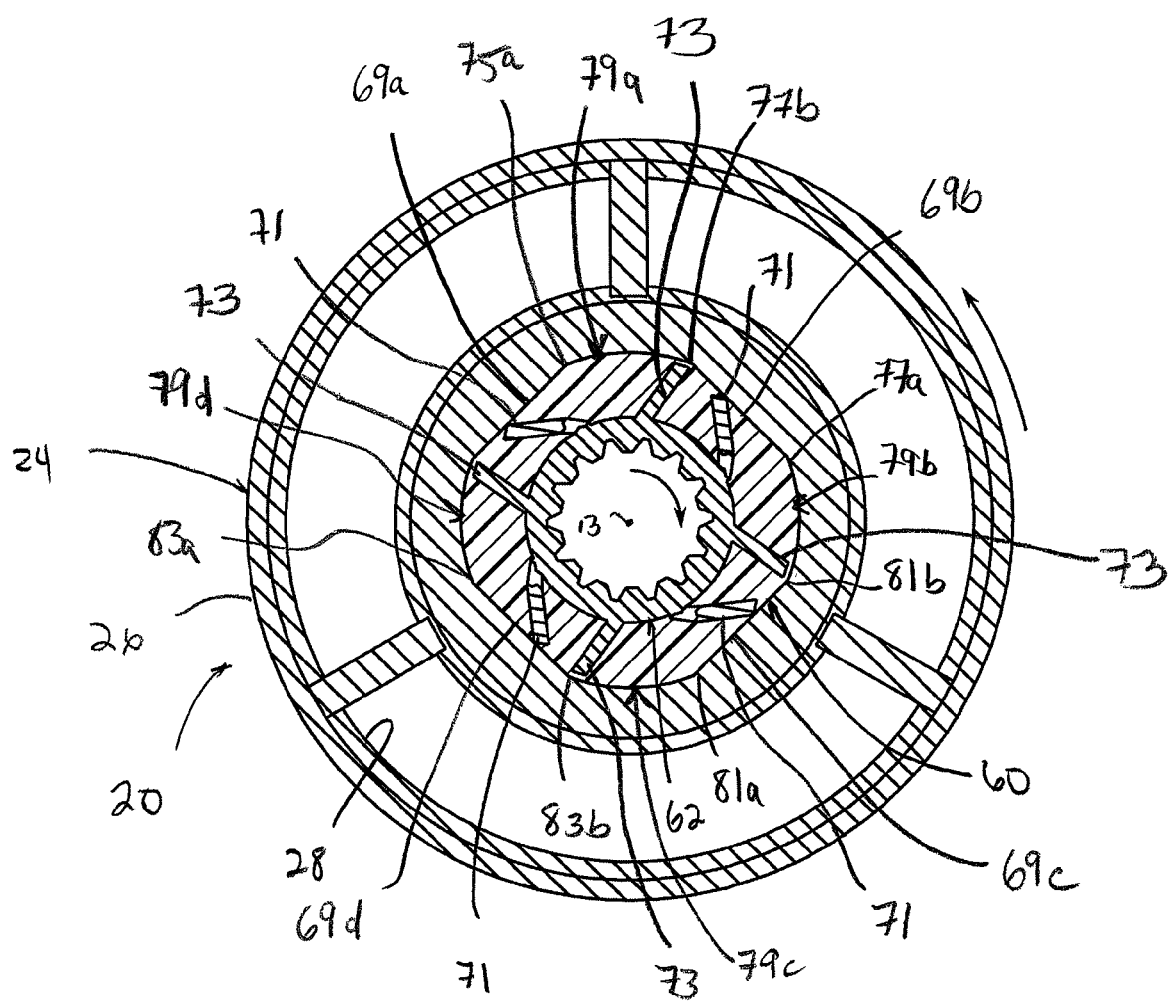
FIG. 9 is a cross-sectional view of the propeller assembly of the present invention, similar to FIG. 8, showing the propeller assembly at a second time period after the propeller housing has stopped rotating while the propeller shaft continues to rotate.

With propeller assembly 10 fixed by the object in the body of water, the rotational force generated by propeller shaft 12 on bushing assembly 60 will urge first fins 71 of fin pairs 68a-68d into engagement with corresponding second sides 41b, 43b, 47b and 49b of corresponding faces 39a-39d of inner surface 36 of inner housing 22, FIG. 8. With first fins 71 of fin pairs 68a-68d engaging corresponding second sides 41b, 43b, 47b and 49b of corresponding faces 39a-39d of inner surface 36 of inner housing 22, it is contemplated for first fins 71 of fin pairs 68a-68d to fragment from outer surface 66 of spindle 62 in response to predetermined forces thereon, FIG. 9.

In the event that propeller blades 30 become disengaged from the object in the water after first fins 71 of fin pairs 68a-68d fragment from outer surface 66 of spindle 62, it can be appreciated that second fins 73 of fin pairs 68a-68d have the ability to translate the rotational force generated by propeller shaft 12 to central hub 20 of propeller assembly 10, as heretofore described. However, if propeller blades 30 of propeller assembly 10 remain fixed by the object in the body of water, the rotational force generated by propeller shaft 12 on bushing assembly 60 will urge second fins 73 of fin pairs 68a-68d into engagement with corresponding second sides 41b, 43b, 47b and 49b of corresponding faces 39a-39d of inner surface 36 of inner housing 22, as heretofore described. With second fins 73 of fin pairs 68a-68d engaging corresponding second sides 41b, 43b, 47b and 49b of corresponding faces 39a-39d of inner surface 36 of inner housing 22, it is contemplated for second fins 73 of fin pairs 68a-68d to fragment from outer surface 66 of spindle 62 in response to predetermined forces thereon. In the event that first and second fins 71 and 73 of fin pairs 68a-68d fragment from outer surface 66 of spindle 62, bushing assembly 60 is free to rotate within cavity 37 of inner housing 22. In such manner, it is intended to avoid damage to the engine and to the drive system of the marine vehicle.

Further, various modes of carrying out the invention are contemplated as being within the scope of the following claims particularly pointing out and distinctly claiming the subject matter which is regarded as the invention.

I claim:

1. In a propeller assembly having a housing structure connectable to a rotatable propeller shaft of a watercraft, the housing structure extending along a longitudinal axis and having an inner surface defining passageway therethrough, the improvement comprising:
   a spindle receivable in the passageway of the housing, the spindle having an inner surface defining a passageway for receiving the propeller shaft therethrough and an outer surface; and
   a plurality of circumferentially spaced, longitudinally extending fin pairs, each fin pair including:
   a first fin extending from the outer surface of the spindle and lying in a first plane; and
   a second fin extending from the outer surface of the spindle and lying in a second plane, the second plane being generally parallel to and spaced from the first plane;
   wherein each fin of a first fin pair is perpendicular to each fin of an adjacent fin pair.

2. The improvement of claim 1 further comprising a bushing molded over the outer surface of the spindle, the bushing including an outer surface engageable with an inner surface of the housing structure.

3. The improvement of claim 2 wherein the bushing is formed from a resilient material.

4. The improvement of claim 3 wherein the bushing has a generally square-shaped cross section and rounded corners.

5. The improvement of claim 1 wherein the inner surface of the spindle includes a plurality of longitudinally extending splines.

6. The improvement of claim 1 wherein the inner surface of the housing structure has a generally square-shaped cross section and wherein at least four fin pairs extend from the outer surface of the spindle.

7. The improvement of claim 1 wherein the fin pairs fragment from the outer surface of the spindle in response to a predetermined force thereon.

8. A propeller assembly for mounting on a rotatable propeller shaft of a watercraft, comprising:
   a housing structure extending along a longitudinal axis, the housing structure including an outer surface and an inner surface defining a cavity having a polygonal-shaped cross-section defined by at least one corner and at least one sidewall; and
   a bushing assembly receivable in the cavity of the housing structure, the bushing assembly including:
   a spindle having an inner surface defining a passageway for receiving the propeller shaft therethrough and an outer surface having a plurality of circumferentially spaced fin pairs extending therealong, each fin pair including:
   a first fin extending from the outer surface of the spindle and lying in a first plane; and
   a second fin extending from the outer surface of the spindle and lying in a second plane, the second plane being generally parallel to and spaced from the first plane; and
   a bushing positioned between the spindle and the inner surface of the housing structure;
   wherein each fin of a first fin pair is perpendicular to each fin of an adjacent fin pair.

9. The propeller assembly of claim 8 wherein the bushing is formed from a resilient material.

10. The propeller assembly of claim 8 wherein the fin pairs fragment from the outer surface of the spindle in response to a predetermined force thereon.

11. A propeller assembly for mounting on a rotatable propeller shaft of a watercraft, comprising:
    a housing structure extending along a longitudinal axis, the housing structure including an outer surface and an inner surface defining a cavity, the inner surface defined by:
    first and second spaced sidewalls, the first and second sidewalls being generally parallel to each other;
    third and fourth spaced sidewalls, the third and fourth sidewalls being generally parallel to each other and being generally perpendicular to the first and second spaced sidewalls;
    a bushing assembly including:
    a spindle having an inner surface defining a passageway for receiving the propeller shaft therethrough and an outer surface;
    a first fin pair extending from the outer surface of the spindle and having a first fin is directed towards the first sidewall of the inner surface of the housing structure and a second fin directed towards the third sidewall;
    a second fin pair extending from the outer surface of the spindle and having a first fin is directed towards the first sidewall of the inner surface of the housing structure and a second fin directed towards the fourth sidewall;
    a third fin pair extending from the outer surface of the spindle and having a first fin is directed towards the second sidewall of the inner surface of the housing structure and a second fin directed towards the third sidewall; and
    a fourth fin pair extending from the outer surface of the spindle and having a first fin is directed towards the second sidewall of the inner surface of the housing structure and a second fin directed towards the fourth sidewall.

12. The propeller assembly of claim 11 further comprising a bushing positioned between the spindle and the inner surface of the housing structure.

13. The propeller assembly of claim 12 wherein the bushing is formed from a resilient material.

14. In a propeller assembly having a housing structure connectable to a rotatable propeller shaft of a watercraft, the housing structure extending along a longitudinal axis and having an inner surface defining passageway therethrough, the improvement comprising:
    a spindle receivable in the passageway of the housing, the spindle having an inner surface defining a passageway for receiving the propeller shaft therethrough and an outer surface; and
    a plurality of circumferentially spaced, longitudinally extending fin pairs, each fin pair including a first fin extending from the outer surface of the spindle and a second fin extending from the outer surface of the spindle at a predetermined angle to the first fin;
    wherein:
    the inner surface of the housing structure is defined by:
    first and second spaced sidewalls, the first and second sidewalls being generally parallel to each other; and
    third and fourth spaced sidewalls, the third and fourth sidewalls being generally parallel to each other and being generally perpendicular to the first and second spaced sidewalls; and
    the first fin of a first fin pair is directed toward the first sidewall of the inner surface of the housing structure and the second fin of the first fin pair is directed toward the third sidewall.

15. The improvement of claim 14 wherein the first fin of a second fin pair is directed toward the first sidewall of the inner surface of the housing structure and the second fin of the second fin pair is directed toward the fourth sidewall.

16. A propeller assembly for mounting on a rotatable propeller shaft of a watercraft, comprising:
- a housing structure extending along a longitudinal axis, the housing structure including an outer surface and an inner surface defining a cavity having a polygonal-shaped cross-section defined by at least one corner and at least one sidewall; and
- a bushing assembly receivable in the cavity of the housing structure, the bushing assembly including:
  - a spindle having an inner surface defining a passageway for receiving the propeller shaft therethrough and an outer surface having a plurality of circumferentially spaced fin pairs extending therealong, each fin pair including a first fin extending from the outer surface of the spindle and a second fin extending from the outer surface of the spindle at a predetermined angle to the first fin; and
  - a bushing positioned between the spindle and the inner surface of the housing structure;

wherein:
- the inner surface of the housing structure has a generally square-shaped cross section;
- the at least one sidewall of the inner surface of the housing structure includes:
  - first and second spaced sidewalls, the first and second sidewalls being generally parallel to each other; and
  - third and fourth spaced sidewalls, the third and fourth sidewalls being generally parallel to each other and being generally perpendicular to the first and second spaced sidewalls; and
- the first fin of a first fin pair is directed toward the first sidewall of the inner surface of the housing structure and the second fin of the first fin pair is directed toward the third sidewall.

17. The propeller assembly of claim 16 wherein the first fin of a second fin pair is directed toward the first sidewall of the inner surface of the housing structure and the second fin of the second fin pair is directed toward the fourth sidewall.

\* \* \* \* \*